Feb. 7, 1939.                H. BANY                 2,146,556
                          CONTROL SYSTEM
                        Filed July 3, 1936
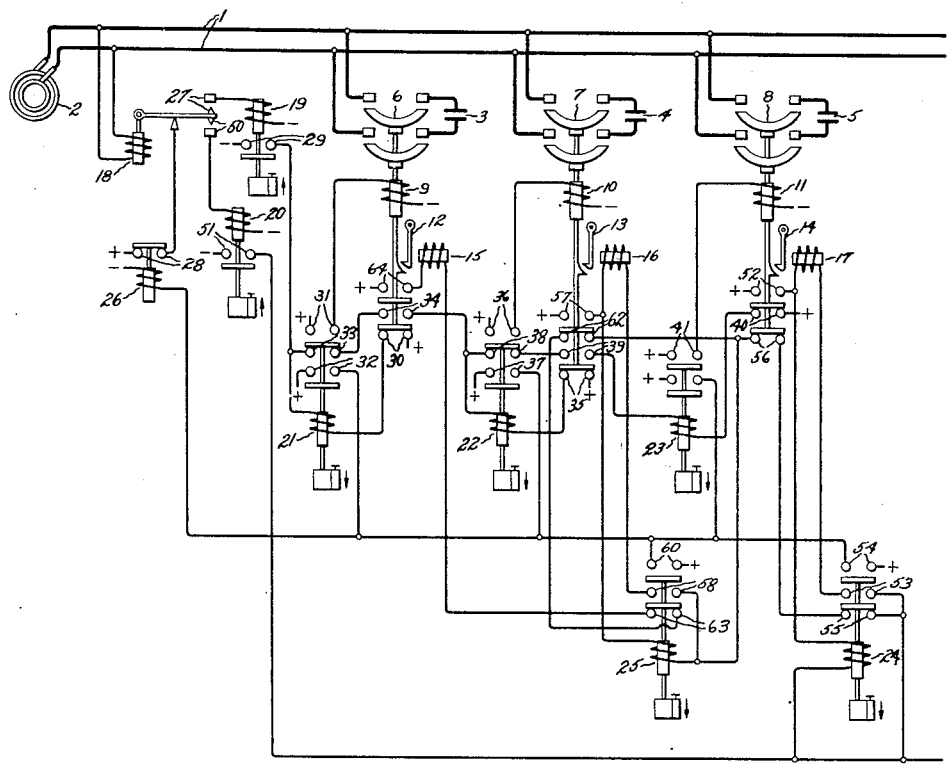
Inventor:
Herman Bany,
by Harry E. Dunham
His Attorney.

Patented Feb. 7, 1939

2,146,556

UNITED STATES PATENT OFFICE 2,146,556

CONTROL SYSTEM

Herman Bany, Lansdowne, Pa., assignor to General Electric Company, a corporation of New York Application July 3, 1936, Serial No. 88,790

16 Claims. (Cl. 175—375)

My invention relates to control systems and particularly to systems for controlling the operation of a plurality of devices in a predetermined sequence, and one object of my invention is to provide an improved simple arrangement for insuring that the devices operate only in the desired sequence.

My invention will be better understood from the following description when taken in connection with the accompanying drawing, and its scope will be pointed out in the appended claims.

Referring to the accompanying drawing, which diagrammatically shows an embodiment of my invention in connection with a system for controlling the sequential connection and disconnection of a plurality of capacitors to and from an electric circuit, I represents an alternating current load circuit connected to a suitable source of alternating current 2. 3, 4 and 5 represent a plurality of capacitors which are arranged to be connected to the alternating current circuit I by means of the circuit breakers 6, 7 and 8 respectively. These circuit breakers may be of any suitable type, examples of which are well known in the art. As shown in the drawing, the circuit breakers 6, 7 and 8 are of the well-known latched-in type and are respectively provided with closing coils 9, 10 and 11, latches 12, 13 and 14 for holding the respective circuit breakers in their closing positions, and trip coils 15, 16 and 17 for respectively releasing the latches 12, 13 and 14.

For controlling the connections between the capacitors 3, 4 and 5 and the load circuit I in response to a predetermined electrical condition of the circuit I, which in the particular arrangement shown in the drawing is the voltage of the circuit I, I provide a contact making voltmeter 18 which is connected to the circuit I so as to be responsive to the voltage thereof. The voltmeter 18 is arranged to effect the completion of a circuit for a time relay 19 when the voltage of the circuit I is below a predetermined value and the completion of a circuit for a time relay 20 when the voltage of the circuit I is above a predetermined value. The time relays 19 and 20 are arranged in any suitable manner so that they do not close their respective contacts until after their respective coils have been energized for a predetermined length of time.

In order that the capacitors 3, 4 and 5 may be successively connected to the circuit I in the order named when the voltage across the circuit I remains below a predetermined value, the relay 19 is arranged to complete an energizing circuit for a hesitating control relay 21 associated with the circuit breaker 6, if this circuit breaker is open. If the circuit breaker 6 is closed and the hesitating control relay 21 is de-energized, the closing of the contacts of the relay 19 is arranged to effect the energization of a hesitating control relay 22 associated with the circuit breaker 7, if this circuit breaker is open. If both of the circuit breakers 6 and 7 are closed and the associated control relays 21 and 22 are in their respective de-energized positions, the closing of the contacts of the relay 19 completes an energizing circuit for a hesitating control relay 23 associated with the circuit breaker 8, if this circuit breaker is open. Each hesitating control relay, when energized, is arranged to effect the closing of an energizing circuit for the closing coil of the associated circuit breaker to effect the closing thereof.

For effecting the disconnection of the capacitors 3, 4 and 5 in the reverse order from that in which they are connected to the circuit I, the relay 20, when energized, is arranged to effect, first, the opening of the circuit breaker 8, if all of the circuit breakers are closed; then the opening of the circuit breaker 7, if the circuit breaker 8 is open; and finally the opening of the circuit breaker 6, if the circuit breakers 7 and 8 are open. When the circuit breaker 8 is closed and the contacts of relay 20 close, a circuit is completed for a hesitating control relay 24 associated with the circuit breaker 8. The relay 24, when energized, effects the completion of an energizing circuit for the trip coil 17 to effect the opening of the circuit breaker 8. When the circuit breaker 7 is closed, the circuit breaker 8 is open and its associated control relay 24 is in its de-energized position, the closing of the contacts of relay 20 completes an energizing circuit for a hesitating control relay 25 associated with the circuit breaker 7. The control relay 25, when energized, effects the completion of an energizing circuit for the trip coil 16 to effect the opening of the circuit breaker 7. When the circuit breaker 6 is closed, the circuit breakers 7 and 8 are open and their associated control relays 24 and 25 are both in their deenergized positions, the closing of the contacts of relay 20 completes an energizing circuit for the trip coil 15 to effect the opening of the circuit breaker 6.

Each of the hesitating control relays, when in its energizing position, is arranged to complete an energizing circuit for a control relay 26 which, when energized, interrupts the energizing circuits of both of the relays 19 and 20. Consequently, when any hesitating control relay is energized to effect the operation of its associated circuit breaker, the next circuit breaker in the predetermined sequence cannot be operated until a sufficient length of time has elapsed for the energized hesitating control relay to return to its de-energized position, the associated circuit breaker to reach its new position, and the time relay 19 or 20 has been energized for a sufficient length of time to close its contacts after the last energized control relay has returned to its de-energized position. In this manner, I am able to provide a simple arrangement for insuring that the circuit breakers 6, 7 and 8 are operated in the desired sequence.

The operation of the arrangement shown in the drawing is as follows: When all of the circuit breakers are open and the voltage of the circuit 1 decreases below a predetermined value, so that the relay 18 closes its contacts 27, a circuit is completed through the contacts 28 of relay 26 for the time relay 19. If the voltage of the circuit 1 remains below this predetermined value for a predetermined length of time, the relay 19 closes its contacts 29 to complete through the contacts 30 of the open circuit breaker 6 an energizing circuit for the hesitating control relay 21. By closing its contacts 31, the relay 21 completes an energizing circuit for the closing coil 9 of the circuit breaker 6 so that this circuit breaker closes and connects the capacitor 3 to the circuit 1. By closing its contacts 32, relay 21 completes an energizing circuit for the relay 26, which, by opening its contacts 28, effects the de-energization of the time relay 19.

If the connection of the capacitor 3 does not restore the voltage of the circuit 1 to normal so that the voltmeter 18 opens its contacts 27, the circuit for the time relay 19 is again completed after the circuit breaker 6 has been closed a predetermined time. By opening its contacts 30, the circuit breaker 6 effects the de-energization of the hesitating control relay 21, which, after being de-energized for a predetermined time, returns to its normal position, thereby opening its contacts 32 and effecting the de-energization of the relay 26. By closing its contacts 28, the above-traced circuit for the time relay 19 is completed. After being energized for a predetermined time, the relay 19 closes its contacts 29 and now completes through the contacts 33 of the hesitating control relay 21 and the auxiliary contacts 34 of the closed circuit breaker 6 and the auxiliary contacts 35 of the open circuit breaker 7 an energizing circuit for the hesitating control relay 22. By closing its contacts 36, the control relay 22 completes an energizing circuit for the closing coil 10 of the circuit breaker 7 to effect the connection of the capacitor 4 to the load circuit 1. By closing its contacts 37, the control relay 22 effects the energization of the control relay 26, which in turn, by opening its contacts 28, effects the de-energization of the time relay 19. By opening its contacts 35, the circuit breaker 7 effects the de-energization of the hesitating control relay 22, which, after being de-energized for a predetermined time, returns to its de-energized position.

If the capacitors 1 and 2 do not take sufficient leading current to restore the voltage of the circuit 1 to normal, the time relay 19 is again energized through the contacts 27 of the contact making voltmeter 18 after the relay 22 has been restored to its normal position and has effected the energization of the relay 26. The closing of the contacts 29 of the relay 19 now completes an energizing circuit for the hesitating control relay 23, through the contacts 33 of the hesitating control relay 21, the auxiliary contacts 34 on closed circuit breaker 6, and contacts 38 of the hesitating control relay 22, auxiliary contacts 39 on the closed circuit breaker 7, and the contacts 40 of the open circuit breaker 8. By closing its contacts 41, the control relay 23 completes an energizing circuit for the closing coil 11 of the circuit breaker 8 to effect the connection of the capacitor 5 to the circuit 1. The closing of the circuit breaker 8 effects the de-energization of the control relay 23, and the control relay 26 in the same manner as the closing of the other circuit breakers did.

When all of the circuit breakers are closed and the voltage across the circuit 1 increases above a predetermined value so that the contact making voltmeter 18 closes its contacts 50, a circuit is completed through the contacts 28 of the relay 26 for the time relay 20. If the voltage remains above this predetermined value for a predetermined time, the relay 20 closes its contacts 51 and completes through the auxiliary contacts 52 on the circuit breaker 8 an energizing circuit for the control relay 24. By closing its contacts 53, the control relay 24 completes an energizing circuit for the trip coil 17 to effect the opening of the circuit breaker 8 so that the capacitor 5 is disconnected from the load circuit 1. By closing its contacts 54, the control relay 24 completes an energizing circuit for the control relay 26, which in turn, by opening its contacts 28, effects the de-energization of the time relay 20. When the circuit breaker 8 opens, the circuit of the control relay 24 is opened at the auxiliary contacts 52 of the circuit breaker so that this control relay returns to its de-energized position a predetermined time after the circuit breaker 8 opens.

If the circuit voltage is still too high after the capacitor 5 has been disconnected and the hesitating control relay 24 has returned to its de-energized position and thereby effected the re-energization of the time relay 20, the closing of the contacts 51 of the time relay 20 effects, through the contacts 55 of the control relay 24, the auxiliary contacts 56 on the circuit breaker 8, and the auxiliary contacts 57 on the circuit breaker 7, an energizing circuit for the control relay 25. By closing its contacts 58, the control relay 25 completes an energizing circuit for the trip coil 16 of the circuit breaker 7 to effect the opening thereof so that the condenser 4 is disconnected from the load circuit 1. By closing its contacts 60, the relay 25 completes an energizing circuit for the control relay 26, which in turn effects the deenergization of the time relay 20 in the manner heretofore described. The opening of the auxiliary contacts 57 of the circuit breaker 7 effects the de-energization of the control relay 25 so that, after the circuit breaker has been opened for a predetermined time, the control relay 25 returns to its de-energized position, thereby effecting the de-energization of the control relay 26 and the re-energization of the time relay 20, if the load circuit voltage is still too high.

The closing of the contacts 51 of the relay 20 after the control relay 25 returns to its normal position completes an energizing circuit through the contacts 55 of the control relay 24, the auxiliary contacts 56 of the circuit breaker 8, the auxiliary contacts 62 of the circuit breaker 7, the contacts 63 of the control relay 25, and the auxiliary contacts 64 of the circuit breaker 6 for the trip coil 15, to effect the opening of the circuit breaker 6 so as to disconnect the capacitor 3 from the load circuit 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a plurality of devices, and means for effecting the operation of said devices in a predetermined sequence including a control relay individual to each device, means responsive to the energization of one of said control relays for effecting the movement of the associated device from one predetermined position to a second predetermined position, and means for effecting the energization of the control relay associated with a device only after each of the control relays associated with the preceding devices in said predetermined sequence has been deenergized subsequent to being energized to effect the movement of its associated device to said second position.

2. In combination, a plurality of devices, and means for effecting the operation of said devices in a predetermined sequence including a control relay individual to each device, means responsive to the energization of one of said control relays for effecting the movement of the associated device from one predetermined position to a second predetermined position, and means controlled by said control relays for effecting the energization of a control relay only when all of the control relays associated with devices preceding in said predetermined sequence the device associated with the control relay being energized are in their de-energized positions and each of said preceding devices is in said second position.

3. In combination, a plurality of devices, and means for effecting the operation of said devices in a predetermined sequence including a control relay individual to each device, means responsive to the energization of one of said control relays for effecting the movement of the associated device from one predetermined position to a second predetermined position, and means for effecting the energization of the control relay associated with a device only after each of the control relays associated with the preceding devices in said predetermined sequence has been deenergized subsequent to being energized to effect the movement of its associated device to said second position, and a common control device for controlling the energization of all of said control relays.

4. In combination, a plurality of devices, and means for effecting the operation of said devices in a predetermined sequence including a control relay individual to each device, means responsive to the energization of one of said control relays for effecting the movement of the associated device from one predetermined position to a second predetermined position, means controlled by said control relays for effecting the energization of a control relay only when all of the control relays associated with devices preceding in said predetermined sequence the device associated with the control relay being energized are in their de-energized positions and each of said preceding devices is in said second position, and a common control device for controlling the energization of all of said control relays.

5. In combination, a plurality of devices, and means for effecting the operation of said devices in a predetermined sequence including a control relay individual to each device, means responsive to the energization of one of said control relays for effecting the movement of the associated device from one predetermined position to a second predetermined position, means for effecting the energization of said control relays including means dependent upon each of the control relays associated with all of the devices preceding in said sequence the device associated with the relay to be energized being in its de-energized position, and means responsive to the energization of a control relay for preventing the energization of another control relay for a predetermined time.

6. In combination, a plurality of devices, and means for effecting the operation of said devices in a predetermined sequence including a control relay individual to each device, means responsive to the energization of one of said control relays for effecting the movement of the associated device from one predetermined position to a second predetermined position, means controlled by said control relays for effecting the energization of a control relay only when all of the control relays associated with devices preceding in said predetermined sequence the device associated with the control relay being energized are in their de-energized positions and each of said preceding devices is in said second position, and means responsive to the energization of a control relay for preventing the energization of another control relay for a predetermined time.

7. In combination, a plurality of switches, and means for effecting the closing of said switches in a predetermined sequence including a hesitating control relay individual to each switch, means responsive to the energization of one of said control relays for effecting the closing of the associated switch, and means controlled by said relays and switches for effecting the energization of a control relay only when all of the switches preceding in said predetermined sequence the switch individual to the control relay being energized are closed and all of the control relays associated with the closed switches are in their de-energized positions.

8. In combination, a plurality of switches, and means for effecting the closing of said switches in a predetermined sequence including a hesitating control relay individual to each switch, means responsive to the energization of one of said control relays for effecting the closing of the associated switch, and means for energizing said relays including means controlled by said relays and switches for effecting the energization of a control relay only when all of the switches preceding in said predetermined sequence the switch individual to the control relay being energized are closed.

9. In combination, a plurality of switches, and means for effecting the closing of said switches in a predetermined sequence including a hesitating control relay individual to each switch, means responsive to the energization of one of said control relays for effecting the closing of the associated switch, means for energizing said relays including means controlled by said relays and switches for effecting the energization of a control relay only when all of the switches preceding in said predetermined sequence the switch individual to the control relay being energized are closed, and means responsive to the energization of a control relay for preventing the energization of another control relay for a predetermined time.

10. In combination, a plurality of switches, and means for effecting the opening of said switches in a predetermined sequence including a hesitating control relay individual to each of certain of said switches, means responsive to the energization of one of said control relays for effecting the opening of the associated switch, and means controlled by said relays and switches for effecting the energization of a control relay only when all of the switches preceding in said predetermined sequence the switch individual to the control relay being energized are open and all of the control relays associated with the open switches are in their de-energized position.

11. In combination, a plurality of switches, and means for effecting the opening of said switches in a predetermined sequence including a hesitating control relay individual to each of certain of said switches, means responsive to the energization of one of said control relays for effecting the opening of the associated switch, and means for energizing said relays including means controlled by said relays and switches for effecting the energization of a control relay only when all of the switches preceding in said predetermined sequence the switch individual to the control relay being energized are open.

12. In combination, a plurality of switches, and means for effecting the opening of said switches in a predetermined sequence including a hesitating control relay individual to each of certain of said switches, means responsive to the energization of one of said control relays for effecting the opening of the associated switch, means for energizing said relays including means controlled by said relays and switches for effecting the energization of a control relay only when all of the switches preceding in said predetermined sequence the switch individual to the control relay being energized are open, and means responsive to the energization of a control relay for preventing the energization of another control relay for a predetermined time.

13. In combination, a plurality of devices, and means for effecting the operation of said devices in a predetermined sequence including a control relay individual to each device, timing means common to said devices, means for initiating the operation of said timing device, means controlled by said control relays and said timing means for energizing said relays including means for effecting the energization of a control relay only when all of the control relays associated with devices preceding in said predetermined sequence the device associated with the control relay being energized are in their de-energized position and said timing means has completed its timing operation, and means responsive to the energization of a control relay for effecting the operation of the associated device and for restoring said timing means to its normal condition.

14. In combination, a plurality of circuit breakers, and means for effecting a predetermined operation of said circuit breakers in a predetermined sequence including a hesitating control relay individual to each circuit breaker, a timing relay common to said circuit breakers, means for energizing said timing relay to initiate the operation thereof, means for energizing said relays including means controlled by said relays for effecting the energization of a control relay only when all of the control relays associated with circuit breakers preceding in said predetermined sequence the circuit breaker associated with the control relay being energized are in their de-energized positions and said timing relay has completed its timing operation, and means responsive to the energization of a control relay for effecting said predetermined operation of the associated circuit breaker and for restoring itself and said timing relay to their respective normal positions.

15. A control arrangement for effecting the operation of two devices in a predetermined order including a control relay associated with one of said devices, means for energizing said control relay, means responsive to the energization of said control relay for effecting the movement of the associated device from one predetermined position to a second predetermined position, means responsive to the movement of said associated device to said second predetermined position for effecting the deenergization of said control relay, and means dependent upon the simultaneous deenergization of said control relay and its associated device being in said second predetermined position for effecting the movement of the other of said devices to a predetermined position.

16. A control arrangement for effecting the operation of two devices in a predetermined order including a control relay associated with one of said devices, means for energizing said control relay, means responsive to the energization of said control relay for effecting the movement of the associated device to a predetermined position and the subsequent deenergization of said control device, and means dependent upon the energization and subsequent deenergization of said control device for controlling the movement of the other of said devices to a predetermined position.

HERMAN BANY.